US00RE46029E

(19) United States
(12) Reissued Patent
Nam et al.

(10) Patent Number: US RE46,029 E
(45) Date of Reissued Patent: Jun. 14, 2016

(54) REFRIGERATOR WITH RECEIVING BOX

(71) Applicant: SAMSUNG ELECTRONICS CO., LTD., Suwon-si, Gyeonggi-do (KR)

(72) Inventors: Jeong Man Nam, Gwangju (KR); Gi Joong Jeong, Gwnagju (KR)

(73) Assignee: SAMSUNG ELECTRONICS CO., LTD., Suwon-Si (KR)

(21) Appl. No.: 14/247,467

(22) Filed: Apr. 8, 2014

Related U.S. Patent Documents

Reissue of:
(64) Patent No.: 8,152,255
Issued: Apr. 10, 2012
Appl. No.: 12/379,119
Filed: Feb. 12, 2009

(30) Foreign Application Priority Data

Mar. 6, 2008 (KR) ..... 10-2008-0020888

(51) Int. Cl.
*A47B 96/04* (2006.01)
*F25D 25/02* (2006.01)

(52) U.S. Cl.
CPC ..... *F25D 25/025* (2013.01)

(58) Field of Classification Search
CPC ..... F25D 25/025
See application file for complete search history.

(56) References Cited

U.S. PATENT DOCUMENTS

| | | | | |
|---|---|---|---|---|
| 2,376,032 | A | 11/1943 | Clare | |
| 2,665,817 | A * | 1/1954 | Whitmore | 220/23.83 |
| 4,501,456 | A * | 2/1985 | Schafer | 312/273 |
| 5,215,363 | A * | 6/1993 | Warwick, III | 312/274 |
| 5,947,573 | A * | 9/1999 | Tovar et al. | 312/404 |
| 6,565,169 | B1 * | 5/2003 | Moreno-Olguin et al. | 312/404 |
| 2003/0201700 | A1 * | 10/2003 | Cho | 312/330.1 |
| 2006/0049731 | A1 * | 3/2006 | Choi et al. | 312/330.1 |
| 2006/0218958 | A1 | 10/2006 | Rand et al. | |
| 2008/0203876 | A1 * | 8/2008 | Lim et al. | 312/405 |
| 2008/0218038 | A1 * | 9/2008 | Wood et al. | 312/116 |

FOREIGN PATENT DOCUMENTS

| | | | |
|---|---|---|---|
| GB | 2 417 671 | | 3/2006 |
| JP | 51-196348 | | 8/1993 |
| JP | 10-122738 | * | 5/1998 |
| JP | 2005-249385 | | 9/2005 |

(Continued)

OTHER PUBLICATIONS

Extended European Search Report dated Jul. 6, 2011, issued in European Patent Application No. 09153417.2

*Primary Examiner* — Sara Clarke
(74) *Attorney, Agent, or Firm* — Staas & Halsey LLP

(57) ABSTRACT

A refrigerator having an improved receiving box in contact with a cover. The refrigerator includes a first receiving box, and a cover installed to come into contact with the first receiving box and adapted to be pivotally rotated as the first receiving box is pulled out or pushed in. The first receiving box includes a sidewall having a downwardly-inclined slope with respect to a front of the first receiving box. The cover is pivotally rotated downward by movement of the cover on the downwardly-inclined slope when the first receiving box is pulled out and is pivotally rotated upward when the first receiving box is pushed in. With this configuration, the refrigerator has the effect of allowing a user to easily move food stored in a plurality of receiving spaces from one receiving space to another.

18 Claims, 8 Drawing Sheets

(56) References Cited

FOREIGN PATENT DOCUMENTS

| | | |
|---|---|---|
| JP | 2006-78168 | 3/2006 |
| JP | 10-2006-0062149 | 6/2006 |
| JP | 10-2006-0075816 | 7/2006 |
| JP | 2007-24339 | 2/2007 |
| KR | 10-2006-0062149 | 6/2006 |
| KR | 10-2006-0075816 | 7/2006 |
| KR | 10-2007-0065710 | 6/2007 |
| WO | WO 2007/036736 | 4/2007 |
| WO | WO 2007/036736 A1 * | 4/2007 |

* cited by examiner (RELATED ART)

REFRIGERATOR WITH RECEIVING BOX

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application [claims the] *is a broadening reissue application of U.S. Pat. No. 8,152,255, which claims the benefit of U.S. application Ser. No. 12/379,119, filed with the U.S. Patent Trademark Office on Feb. 12, 2009 and issued as U.S. Pat. No. 8,152,255 on Apr. 10, 2012, and earlier priority* benefit of Korean Patent Application No. [2008-0020888] *10-2008-0020888*, filed on Mar. 6, 2008 in the Korean Intellectual Property Office, the disclosure of which is incorporated herein by reference.

BACKGROUND

1. Field

The present invention relates to a refrigerator, and, more particularly, to a refrigerator, which can prevent receiving boxes stacked above one mother from interfering with each other when the receiving boxes are opened together.

2. Description of the Related Art

A refrigerator is an apparatus to keep food fresh using a temperature difference that occurs when a refrigerant circulating in a refrigeration cycle undergoes phase transition via repeated compression, condensation, and expansion thereof.

The interior of the refrigerator is generally divided into a freezing compartment and a refrigerating compartment, according to an interior temperature thereof. The freezing compartment generally maintains a temperature band of −12° C.~24° C., and the refrigerating compartment generally maintains a temperature band of 0° C.~7° C. In particular, the refrigerating compartment contains a separate space to maintain an appropriate interior temperature and humidity well suited to storage of vegetables, fruits, etc. Specifically, a separate receiving box is provided in the refrigerating compartment, and a temperature and humidity of the receiving box are adjustable.

FIG. 1 is a sectional view illustrating a receiving box installed in a conventional refrigerator.

As shown in FIG. 1, a plurality of shelves 2 is installed in a refrigerating compartment 1. The shelves 2 serve to divide the interior of the refrigerating compartment 1 into several regions, allowing several kinds of food to be sorted and stored in the respective regions of the refrigerating compartment 1. In particular, receiving boxes 3 and 4 are installed in lower regions of the refrigerating compartment 1 and can serve to separately store food that must be kept fresh. The receiving boxes 3 and 4 are stacked above one another. Here, a lower one of the receiving boxes is referred to as a first receiving box 3, and an upper one of the receiving boxes is referred to as a second receiving box 4.

To maximize utilization of the interior space of the refrigerating compartment 1, the first receiving box 3 and second receiving box 4 are arranged stepwise. Specifically, the first receiving box 3 protrudes forward relative to the second receiving box 4. More specifically, for food storage in the refrigerating compartment 1, in addition to the plurality of shelves 2, a refrigerating compartment door 6 is provided with racks 7 to receive containers, such as bottles. In light of the racks 7 occupying a predetermined interior space of the refrigerating compartment 1 when the refrigerating compartment door 6 is closed, the first receiving box 3 and second receiving box 4 must be arranged stepwise, to prevent the racks 7 from interfering with the receiving boxes 3 and 4 and also, to increase utilization of the interior space of the refrigerating compartment 1.

Although a top of the second receiving box 4 is able to be closed by the shelf 2 immediately thereabove, closing a top of the first receiving box 3 necessitates a separate cover 5 in addition to the shelf 2 thereabove. The cover 5 is used to close a specific portion of the first receiving box 3 which protrudes forward relative to the second receiving box 4 and thus, is still opened after the remaining portion of the first receiving box 3 is closed by the shelf 2. The cover 5 is coupled to the shelf 2 by means of hinges. A related technology is disclosed in Korean Patent Laid-Open Publication No. 10-2007-0065710.

However, in the arrangement of stacking the first receiving box 3 and second receiving box 4 above one another as shown in FIG. 1, simultaneously opening the first receiving box 3 and second receiving box 4 is problematic. As disclosed in the above-mentioned Patent Laid-Open Publication, when the first receiving box 3 is opened, the cover 5 is obliquely lifted upward along a frictional surface of the first receiving box 3. Accordingly, when opening the second receiving box 4, the second receiving box 4 collides with the upwardly-inclined cover 5 and cannot be opened. In conclusion, it is impossible to open both the first receiving box 3 and second receiving box 4 simultaneously. This makes it difficult to move food stored in the first receiving box 3 to the second receiving box 4, and vice versa, resulting in inconvenience of use.

SUMMARY

Accordingly, it is an aspect of the embodiment to provide a refrigerator in which a receiving box in contact with a cover is improved to allow all receiving boxes stacked above one another to be opened successively.

Additional aspects and/or advantages will be set forth in part in the description which follows and, in part, will be obvious from the description, or may be learned by practice of the invention.

In accordance with an aspect of the invention, the above and/or other aspects can be achieved by the provision of a refrigerator, including: a body defining a storage compartment to hold foodstuff to be cooled; a receiving box installed in the storage compartment and configured to be pulled out from and pushed into the storage compartment and including at least one sidewall having a downwardly-inclined slope inclined downwardly with respect to a front of the receiving box; and a cover installed to come into contact with and cover the receiving box and adapted to be pivotally rotated as the receiving box is pulled out or pushed in, the cover being pivotally rotated downward by movement of the cover on the downwardly-inclined slope when the receiving box is pulled out and being pivotally rotated upward when the receiving box is pushed in.

The at least one sidewall may further include an upwardly-inclined slope inclined upwardly with respect to the front of the receiving box and provided in front of the downwardly-inclined slope, the cover being pivotally rotated upward by movement of the cover on the upwardly-inclined slope when the receiving box is pulled out and being pivotally rotated downward when the receiving box is pushed in.

The at least one sidewall may further include a horizontal plane provided between the upwardly-inclined slope and the downwardly-inclined slope to keep the cover in the upwardly pivotally rotated state.

The cover may include a downwardly-protruding rolling frictional portion in contact with the receiving box.

The rolling frictional portion may include a roller to cause rolling friction between the cover and the receiving box.

The receiving box may be pulled out from the body in a sliding manner, and the receiving box may be provided with a three-section telescopic slide rail.

The refrigerator may further include a auxiliary receiving box configured to be pulled out at an upper side of the receiving box when the receiving box is pulled out.

The body may be provided with a guide member to permit sliding of the auxiliary receiving box, the guide member being provided with a roller to facilitate smooth sliding of the second receiving box.

The downwardly-inclined slope may be provided on a rear portion of the sidewall of the receiving box.

In accordance with another aspect of the invention, there is provided a refrigerator, including: a body defining a storage compartment to hold foodstuff to be cooled; first and second receiving boxes stacked in the body one above another to allow the first and second receiving boxes to be pulled out respectively from the storage compartment, the first receiving box including at least one sidewall having an upwardly-inclined slope inclined upwardly with respect to a front of the first receiving box and a downwardly-inclined slope inclined downwardly with respect to the front of the first receiving box; and a cover installed between the first receiving box and the second receiving box and configured to open or close a top of the first receiving box, the cover being pivotally rotated upward by movement of the cover on the upwardly-inclined slope when the first receiving box is pulled out and being pivotally rotated downward by movement of the cover on the downwardly-inclined slope, to permit the second receiving box to be pulled out in a state in which the first receiving box is pulled out.

The upwardly-inclined slope may be provided in front of the downwardly-inclined slope, and the at least one sidewall may further include a horizontal plane provided between the upwardly-inclined slope and the downwardly-inclined slope.

The first receiving box may have a longer pull-out distance than a pull-out distance of the second receiving box to easily move food stored in the first receiving box to the second receiving box and vice versa after both the first and second receiving boxes are pulled out.

The refrigerator may further include a three-section telescopic slide rail provided between the first receiving box and the body to increase the pull-out distance of the first receiving box.

In accordance with a further aspect of the invention, there is provided a refrigerator, including: a body defining a storage compartment to hold the foodstuff to be cooled; a first receiving box configured to be pulled out from the storage compartment; at least one second receiving box positioned above the first receiving box and configured to be pulled out from the storage compartment, and a cover configured to open or close a part of a top of the first receiving box, the cover being pivotally rotated with respect to a pulling-out of the first receiving box, the cover avoiding a pull-out path of the at least one second receiving box when the at least one second receiving box is pulled out from the body while the first receiving box is pulled out from the body.

In accordance with a still further aspect of the invention, there is provided a receiving box of a refrigerator having a storage compartment to hold foodstuff to be cooled, including: a receiving box body capable of being pulled out from the storage compartment of the refrigerator and including an upwardly-inclined slope inclined upwardly with respect to a front of the receiving box body and a downwardly-inclined slope inclined downwardly with respect to the front of the receiving box body at least one side of the receiving box body.

The receiving box may be a lower receiving box, and the refrigerator may include at least one upper receiving box positioned above the lower receiving box and a cover, the cover covering the front of the lower receiving box when the lower receiving box is completely pushed into the storage compartment of the refrigerator and being pivotally rotated upward along the upwardly-inclined slope and downward along the downwardly-inclined slope when the lower receiving box is pulled out from the storage compartment of the refrigerator.

In accordance with a still further aspect of the invention, there is provided a refrigerator, including: a storage compartment to hold foodstuff to be cooled; a first receiving box located in a lower region of the storage compartment; a second receiving box located in an upper region of the storage compartment; and a cover disposed between the first receiving box and the second receiving box and configured to open or close at least a part of a top of the first receiving box, wherein the first receiving box is provided on a rear portion thereof with a downwardly-inclined slope inclined downwardly with respect to a front of the first receiving box, the downwardly-inclined slope enabling the cover to be pivotally rotated downward to permit the second receiving box to be opened in an open state of the first receiving box.

In accordance with a still further aspect of the invention, there is provided a refrigerator, including: a storage compartment to hold foodstuff to be cooled; a receiving box provided in the storage compartment and having an open top; and a cover located above the receiving box and configured to open or close the top of the receiving box, wherein the cover includes a pivotally rotatable first cover, the first cover including a rolling frictional portion to come into contact with the receiving box and the receiving box including a sidewall corresponding to the rolling frictional portion, and the sidewall is provided on a rear portion thereof with a slope to permit the first cover to be pivotally rotated downward.

BRIEF DESCRIPTION OF THE DRAWINGS

These and/or other aspects and advantages of the embodiments will become apparent and more readily appreciated from the following description of the embodiments, taken in conjunction with the accompanying drawings, of which.

DETAILED DESCRIPTION OF EMBODIMENT

Figure 1:
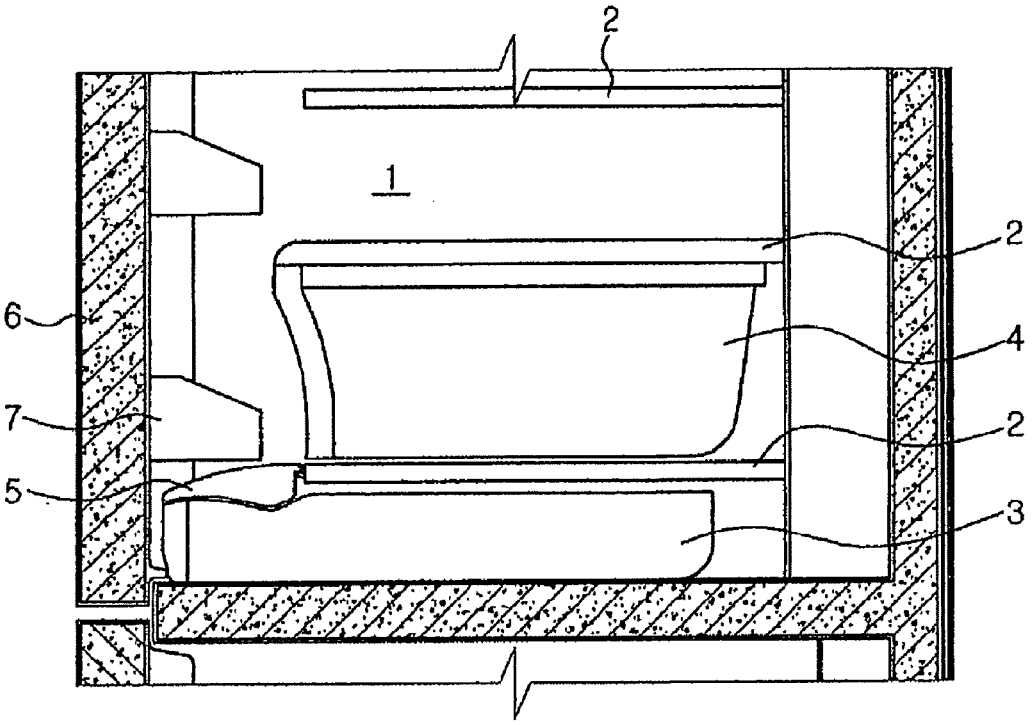
FIG. 1 is a sectional view illustrating a receiving box installed in a conventional refrigerator.

Reference will now be made in detail to the embodiment, examples of which are illustrated in the accompanying drawings, wherein like reference numerals refer to like elements throughout. The embodiments are described below to explain the present invention by referring to the figures.

Figure 2:
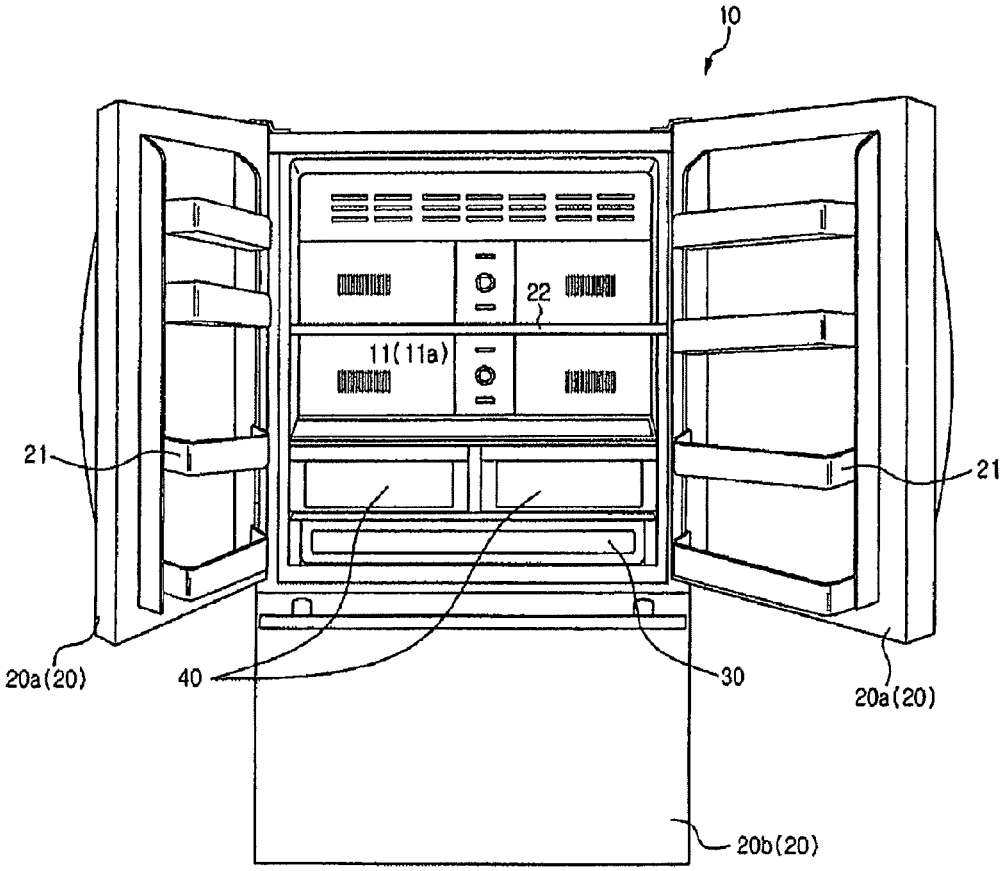
FIG. 2 is a front view illustrating an external appearance of a refrigerator in accordance with the present embodiment.
Figure 3:
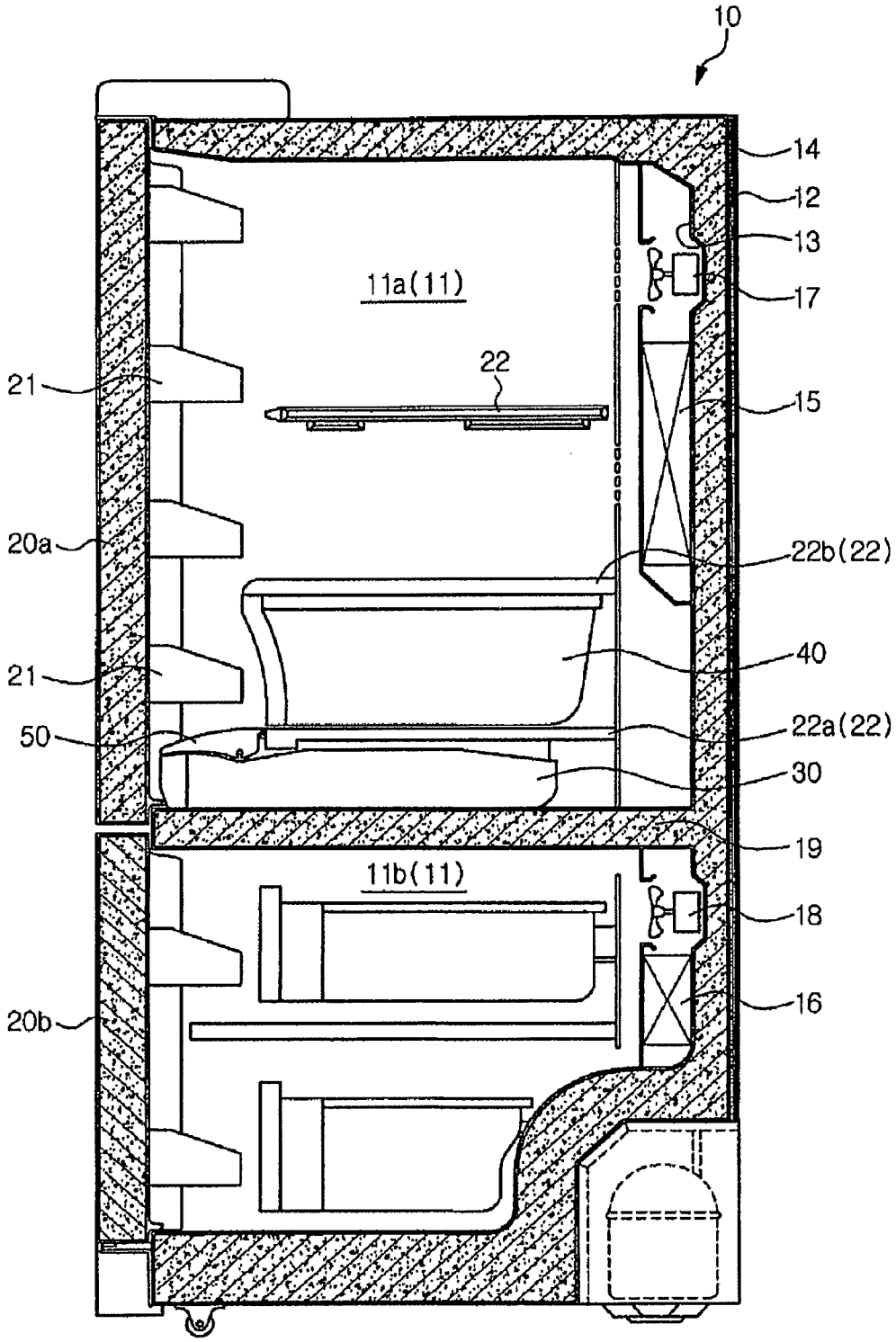
FIG. 3 is a sectional view illustrating configuration of the refrigerator in accordance with the present embodiment.

FIG. 2 is a front view illustrating an external appearance of a refrigerator in accordance with the present embodiment. FIG. 3 is a sectional view illustrating configuration of the refrigerator in accordance with the present embodiment.

As shown in FIGS. 2 and 3, the refrigerator in accordance with the present embodiment includes a body 10 having a storage compartment 11 in which food is stored, doors 20 to open or close the storage compartment 11, and first and second receiving boxes 30 and 40, each of which provides an independent storage space to more efficiently keep food, such as vegetables, fruits, etc., fresh by preventing dehydration thereof. *The first and second receiving boxes 30 and 40 may be drawers, for example a drawer and another drawer.*

The body 10 includes an outer shell 12 defining an outer surface thereof, and an inner shell 13 spaced apart from the outer shell 12 by a predetermined distance and defining the storage compartment 11 therein. An insulating material 14 is formed in a space between the outer shell 12 and the inner shell 13 to prevent thermal conduction.

The refrigerator shown in FIGS. 2 and 3 is a so-called French-type refrigerator. The storage compartment 11 is divided into upper and lower sections by an intermediate partition 19, an upper section serving as a refrigerating compartment 11a for the refrigeration and storage of food, and a lower section serving as a freezing compartment 11b for the freezing and storage of food. The doors 20 include two refrigerating compartment doors 20a that may be hingedly coupled to the body 10 to open or close the refrigerating compartment 11a via pivotal rotation thereof, and a single freezing compartment door 20b slidably installed to the body 10 to open or close the freezing compartment 11b via forward and rearward movement thereof.

Evaporators 15 and 16 are installed in a rear region of the storage compartment 11 to produce cold air to be supplied into the storage compartment 11 via heat exchange with the surrounding air. Circulating fans 17 and 18 to circulate the interior air of the storage compartment 11 are installed near the respective evaporators 15 and 16.

A plurality of shelves 22 is installed in the storage compartment 11 to sort and store various kinds of food thereon. The plurality of shelves 22 is spaced apart from one another by a predetermined distance. Also, a plurality of racks 21 to store bottles, etc. is installed at inner walls of the refrigerating doors 20 used to open or close the storage compartment 11. The plurality of racks 21 is also spaced apart from one another by a predetermined distance.

Each rack 21 protrudes from the inner wall of the corresponding door 20 into the storage compartment 11. Therefore, when the door 20 is closed, the rack 21 occupies a predetermined interior space of the storage compartment 11. Therefore, to maximize utilization of the interior space of the refrigerating compartment 11a, the first and second receiving boxes 30 and 40 provided in the refrigerating compartment 11a are arranged stepwise. Specifically, the first receiving box 30 is installed underneath a first shelf 22a, and the second receiving box 40 is installed underneath a second shelf 22b. In this case, a front end of the first receiving box 30 is introduced into a space below the rack 21, and a front end of the second receiving box 40 is arranged to face the rack 21.

Figure 4:
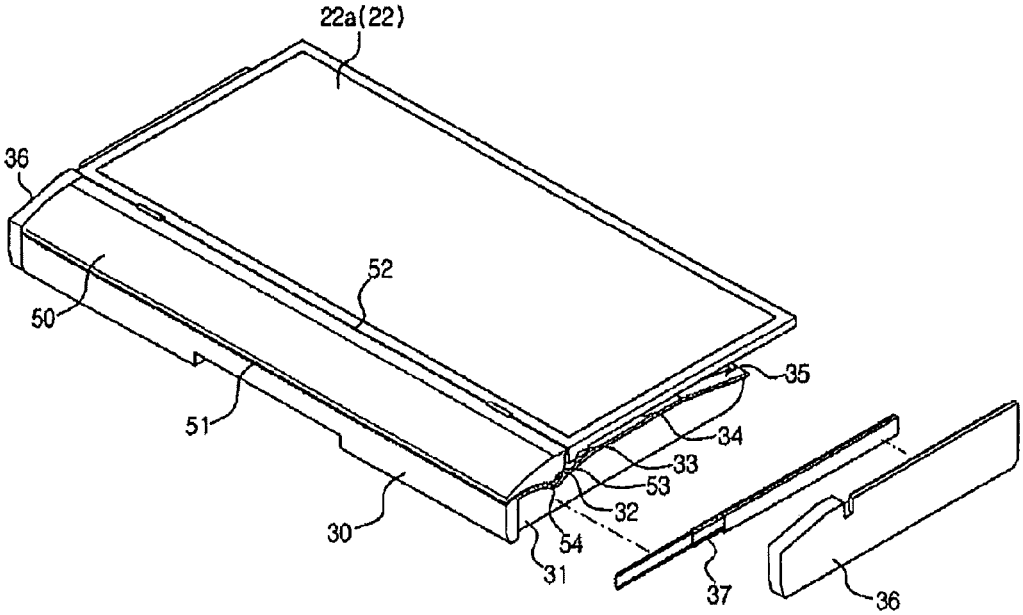
FIG. 4 is a perspective view illustrating a first receiving box in accordance with the present embodiment.

FIG. 4 is a perspective view illustrating the first receiving box in accordance with the present embodiment.

As shown in FIG. 4, the first receiving box 30 is installed slidably underneath the first shelf 22a. Both wall surfaces of the refrigerating compartment 11a (see FIG. 2), adjacent to both sidewalls 31 of the first receiving box 30, are provided with rail fixing members 36, each of which can be used to install a three-section telescopic slide rail 37. One surface of the three-section telescopic slide rail 37 is attached to the corresponding sidewall 31 of the first receiving box 30, and the other surface of the rail 37 is attached to the rail fixing member 36. As compared to the use of a conventional two-section telescopic slide rail, the three-section telescopic slide rail 37 of the present embodiment has an effect of increasing a pull-out distance of the first receiving box 30. However, the embodiment is not limited to the use of either a three-section or a two-section telescopic rail, but may include any type of singular or multiple sectional rail system.

When the first receiving box 30 is pulled out, food can be put into and stored in the first receiving box 30 through an open top of the first receiving box 30. Then, when the first receiving box 30 is pushed in, a part of the open top of the first receiving box 30 is closed by the first shelf 22a, and the remaining open top of the first receiving box is closed by a cover 50. Specifically, as shown in FIG. 3, since the first receiving box 30 protrudes forward relative to the second receiving box 40 to achieve maximum space utilization, the first receiving box 30 cannot be closed completely by only the first shelf 22a. Accordingly, the cover 50 is provided at the top of the first receiving box 30 to completely close the first receiving box 30, allowing the first receiving box 30 to define an independent receiving space.

The cover 50 is hingedly coupled to the first shelf 22a to carry out pivotal rotation. A front end 51 of the cover 50 is a free end, and a rear end 52 of the cover 50 is hingedly coupled to the first shelf 22a. Accordingly, the rear end 52 of the cover 50 is a fixed end to allow the cover 50 to pivotally rotate about the rear end 52. At least one rolling frictional portion 53 protrudes downward from at least one side end of a lower surface of the cover 50. The rolling frictional portion 53 comes into contact with the first receiving box 30, causing rolling friction. The first receiving box 30 is formed, at an upper surface of either sidewall 31 thereof, with a seating recess 32 such that the rolling frictional portion 53 is seated therein. The rolling frictional portion 53 causes friction with the first receiving box 30 when the first receiving box 30 is pulled out or pushed in. To achieve rolling friction between the rolling frictional portion 53 and the first receiving box 30, the rolling frictional portion 53 is provided with a roller 54, to allow the rolling frictional portion 53 to smoothly roll on the first receiving box 30. However, instead of providing the roller 54, the rolling frictional portion 53 may be configured to cause sliding friction relative to the first receiving box 30. That is to say, there is no problem to practice the present embodiment even when no roller is present. In the present embodiment, the reason the rolling frictional portion 53 is provided with the roller 54 to cause rolling friction is only for the purpose of reducing noise caused when the first receiving box 30 is pulled out or pushed in.

The upper surface of the sidewall 31 of the first receiving box 30, which comes into contact with the rolling frictional portion 53, is longitudinally formed with different several slopes. Specifically, the upper surface of the sidewall 31 includes an upwardly-inclined slope 33 extending rearward from the seating recess 32, a horizontal plane 34 extending rearward from the upwardly-inclined slope 33, and a downwardly-inclined slope 35 extending rearward from the horizontal plane 34. With this configuration, when the first receiving box 30 is pulled out or pushed in, the cover 50 can carry out rotational reciprocating motion while the rolling frictional portion 53 causes rolling friction with the first receiving box 30. Specifically, when the first receiving box 30 is pulled out, the rolling frictional portion 53 of the cover 50 first rolls on the upwardly-inclined slope 33 provided at the upper surface of the at least one sidewall 31 of the first receiving box 30, causing the front end 51 of the cover 50 to be pivotally rotated and lifted upward. Then, as the rolling frictional portion 53 rolls on the downwardly-inclined slope 35 provided at the upper surface of the sidewall 31, the front end 51 of the cover 51 is pivotally rotated downward.

When the first receiving box 30 is pushed in, the front end 51 of the cover 50 is pivotally rotated and lifted upward as the rolling frictional portion 53 rolls on the downwardly-inclined slope 35, and then is rotated downward as the rolling frictional portion 53 rolls on the upwardly-inclined slope 33.

Figure 5:
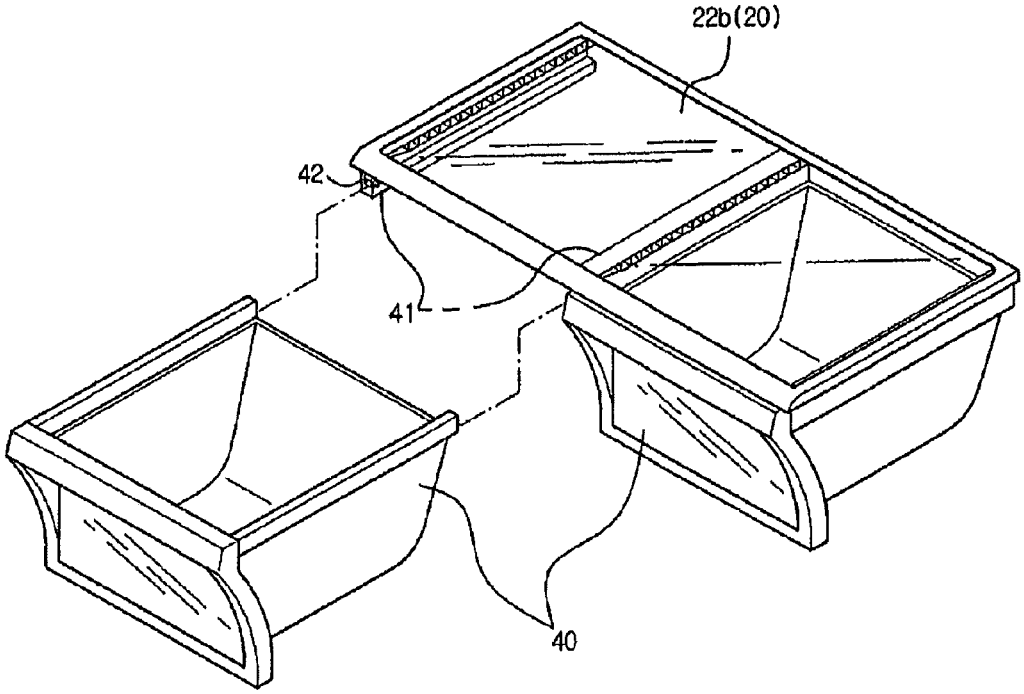
FIG. 5 is a perspective view illustrating a second receiving box in accordance with the present embodiment.

FIG. 5 is a perspective view illustrating the second receiving box in accordance with the present embodiment.

As shown in FIG. 5, the second receiving box 40 may include two receiving boxes arranged in parallel underneath the second shelf 22b. The two second receiving boxes 40 can be pulled out or pushed in as the boxes 40 slide forward or rearward by guide members 41, which are installed at both sides and at the center of the second shelf 22b. In this case, the guide members 41 are provided with rollers 42, respectively, to achieve smooth sliding of the second receiving boxes 40. Each second receiving box 40 has an open top, such that food, etc. can be put into the second receiving box 40 after the second receiving box 40 is pulled out. Once the second receiving box 40 is again pushed in, the top of the second receiving box 40 is closed by the second shelf 22b, allowing the second receiving box 40 to define an independent receiving space.

Hereinafter, operation of the first and second receiving boxes for the refrigerator in accordance with the present embodiment will be described in detail with reference to the accompanying drawings.

Figure 6:
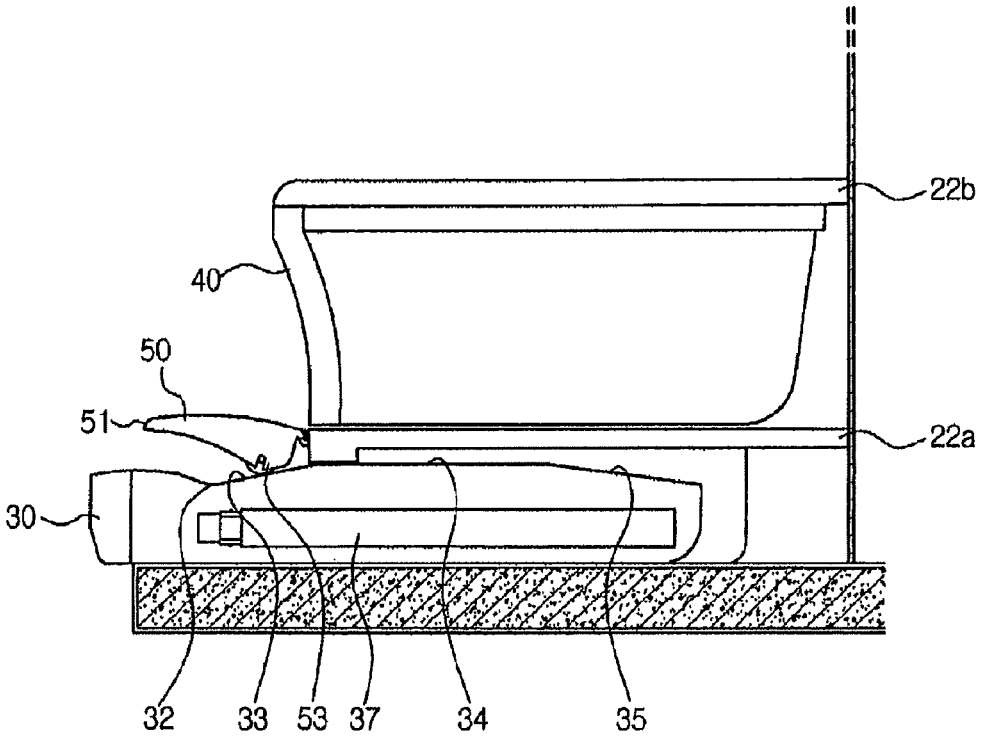
FIGS. 6 to 8 are side views illustrating operation of the first and second receiving boxes in accordance with the present embodiment.
Figure 7:
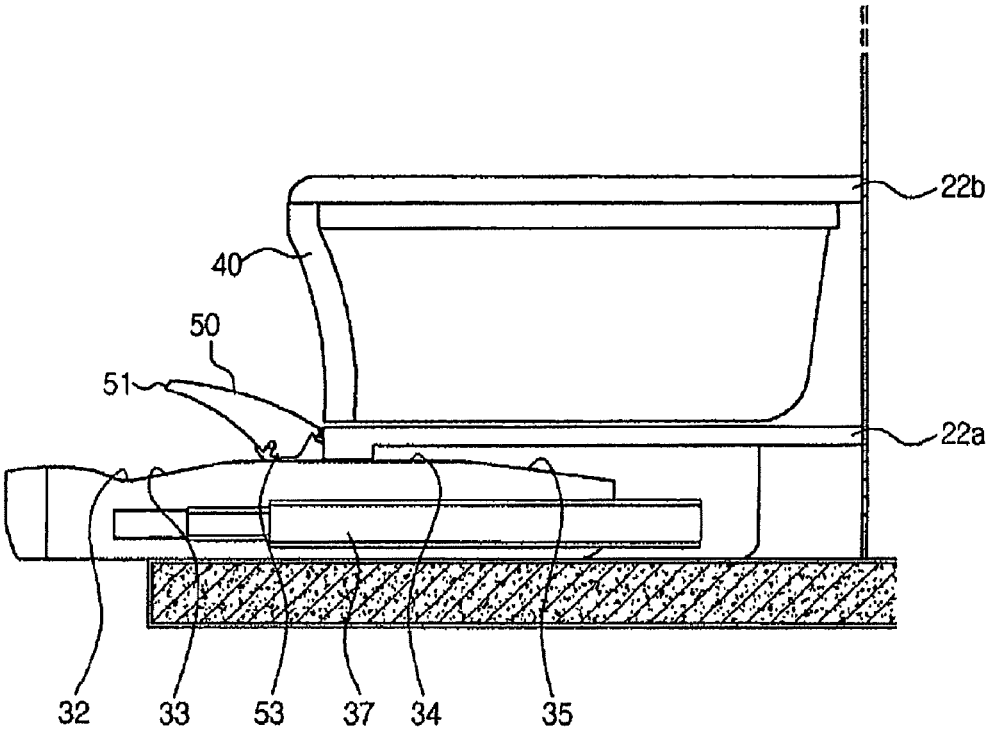
Figure 8:
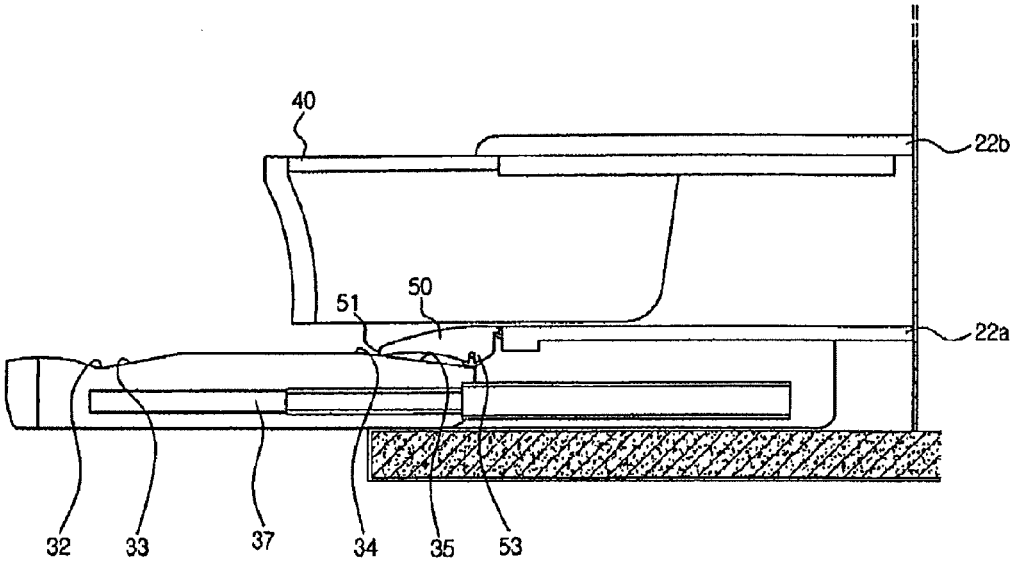

FIGS. 6 to 8 are side views illustrating operation of the first and second receiving boxes in accordance with the present embodiment.

When a user initially pulls out the first receiving box 30, as shown in FIG. 6, each rolling frictional portion 53 of the cover 50 first rolls on the upwardly-inclined slope 33 of the first receiving box 30. In this case, since the rear end 52 of the cover 50 is hingedly coupled to enable pivotal rotation of the cover 50, the front end 51 of the cover 50 is pivotally rotated and lifted upward during rolling of the rolling frictional portion 53 on the upwardly-inclined slopes 33. Thereby, the front end 51 of the cover 50 is spaced apart from the first receiving box 30, providing a wide open space between the cover 50 and the first receiving box 30. Consequently, there is provided a wide space for entrance/exit of food into or from the first receiving box 30, allowing the user to easily put in or take out food.

As the user continuously pulls out the first receiving box 30, as shown in FIG. 7, the rolling frictional portion 53 rolls on the horizontal plane 34. During rolling of the rolling frictional portion 53 on the horizontal plane 34, the front end 51 of the cover 50 is continuously kept at a position spaced apart from the first receiving box 30, providing the entrance/exit of food into or from the first receiving box 30.

Finally, when the user completely pulls out the first receiving box 30, as shown in FIG. 8, the rolling frictional portion 53 rolls on the downwardly-inclined slope 35. During rolling of the rolling frictional portion 53 on the downwardly-inclined slope 35, the front end 51 of the cover 50 is pivotally rotated downward. Specifically, the front end 51 of the cover 50 is tilted toward the first receiving box 30 or is brought into contact with the first receiving box 30. Thus, the cover 50 does not interfere with a pull-out path of the second receiving box 40. As a result, the second receiving box 40 can be pulled out even after the first receiving box 30 is pulled out.

In conclusion, the user can easily interchange food stored in the first receiving box 30 with food stored in the second receiving box 40 in a state wherein both the first and second receiving boxes 30 and 40 are pulled out together.

As apparent from the above description, the present embodiment provides a refrigerator, in which food stored in a plurality of receiving spaces can be easily moved from one receiving space to another. This has the effect of improving convenience of use of the receiving spaces, resulting in high consumer satisfaction.

Further, as a result of providing a first receiving box with a three-section telescopic slide rail, the first receiving box can achieve an increased pull-out distance. This has the effect of allowing a user to easily identify food stored in the first receiving box and achieving convenient storage.

Furthermore, according to the present embodiment, the receiving box is provided with a roller or three-section telescopic slide rail, and can achieve comfortable sliding operation thereof.

Although the embodiment has been shown and described, it would be appreciated by those skilled in the art that changes may be made in this embodiment without departing from the principles and spirit of the invention, the scope of which is defined in the claims and their equivalents.

What is claimed is:

1. A refrigerator, comprising:

a body defining a storage compartment [to hold foodstuff to be cooled];

a receiving box installed in the storage compartment and configured to be pulled out from and pushed into the storage compartment and including at least one sidewall having a downwardly-inclined slope [inclined downwardly] with respect to a front of the receiving box and an upwardly-inclined slope [inclined upwardly] with respect to the front of the receiving box and provided in front of the downwardly-inclined slope, the downwardly-inclined slope being provided on a rear portion of the sidewall of the receiving box;

an auxiliary receiving box configured to be pulled out [at an upper side of] *above* the receiving box when the receiving box is pulled out; and a cover installed to come into contact with and cover the receiving box and adapted to be pivotally rotated as the receiving box is pulled out or pushed in, the cover being pivotally rotated downward by movement of the cover on the downwardly-inclined slope when the receiving box is pulled out and being pivotally rotated upward when the receiving box is pushed in, wherein the cover is rotated upward by movement of the cover on the upwardly-inclined slope when the receiving box is pulled out and is pivotally rotated downward when the receiving box is pushed in, and the cover is pivotally rotated downward when the auxiliary receiving box is pulled out when the receiving box is also pulled out.

2. The refrigerator according to claim 1, wherein the at least one sidewall further includes a horizontal plane provided between the upwardly-inclined slope and the downwardly-inclined slope to keep the cover in the upwardly pivotally rotated state.

3. The refrigerator according to claim 1, wherein the cover includes a downwardly-protruding rolling frictional portion in contact with the receiving box.

4. The refrigerator according to claim 3, wherein the rolling frictional portion includes a roller to cause rolling friction between the cover and the receiving box.

5. The refrigerator according to claim 1, wherein the receiving box is able to be pulled out from the body in a sliding manner, and the receiving box is provided with a three-section telescopic slide rail.

6. The refrigerator according to claim 1, wherein the body is provided with a guide member to permit sliding of the auxiliary receiving box, the guide member being provided with a roller to facilitate smooth sliding of the auxiliary receiving box.

7. A refrigerator, comprising:

a body defining a storage compartment [to hold foodstuff to be cooled];

[first and second] receiving boxes stacked in the body one above another to allow the [first and second] receiving boxes to be pulled out respectively from the storage compartment, *one of* the [first] receiving [box] *boxes* including at least one sidewall having an upwardly-inclined slope [inclined upwardly] with respect to a front of the [first] *one of the* receiving [box] *boxes* and a downwardly-inclined slope [inclined downwardly] with respect to the front of the [first] *one of the* receiving [box] *boxes*, the downwardly-inclined slope being provided on a rear portion of the sidewall of the [first] *one of the* receiving [box] *boxes*; and a cover installed between the [first] receiving [box and the second receiving box] *boxes* and configured to open or close a top of the [first] *one of the* receiving [box] *boxes*, the cover being pivotally rotated upward by movement of the cover on the upwardly-inclined slope when the [first] *one of the* receiving [box] *boxes* is pulled out and being pivotally rotated downward by movement of the cover on the downwardly- inclined slope when *an other of* the [second] receiving [box] *boxes* is pulled out [when the receiving box is also pulled out], to permit the [second] *other of the* receiving [box] *boxes* to be pulled out in a state in which the [first] *one of the* receiving [box] *boxes* is also pulled out.

8. The refrigerator according to claim 7, wherein the at least one sidewall further includes a horizontal plane provided between the upwardly-inclined slope and the downwardly-inclined slope.

9. The refrigerator according to claim 7, wherein the [first] *one of the* receiving [box] *boxes* has a longer pull-out distance than a pull-out distance of the [second] *other of the* receiving [box to easily move food stored in the first receiving box to the second receiving box and vice versa after both the first and second receiving boxes are pulled out] *boxes*.

10. The refrigerator according to claim 9, further comprising a three-section telescopic slide rail provided between the [first] *one of the* receiving [box] *boxes* and the body [to increase the pull-out distance of the first receiving box].

11. A refrigerator, comprising:

a storage compartment [to hold foodstuff];

a first receiving box located in [a lower region of] the storage compartment;

a second receiving box located *above the first receiving box* in [an upper region of] the storage compartment; and a cover disposed between the first receiving box and the second receiving box and configured to open or close at least a part of a top of the first receiving box, wherein the first receiving box is provided on a rear portion thereof with a downwardly-inclined slope inclined downwardly with respect to a front-*to-rear direction* of the first receiving box, the downwardly-inclined slope enabling the cover to be pivotally rotated downward to permit the second receiving box to be opened in an open state of the first receiving box*, the rear portion being a portion of the first receiving box behind a midpoint of the first receiving box in the front-to-rear direction of the first receiving box.*

*12. A refrigerator, comprising:*

*a storage compartment;*

*a drawer located in the storage compartment;*

*another drawer located above the drawer in the storage compartment; and*

*a cover to cover at least a front part of a top of the drawer when the drawer is in a pushed in state,*

*wherein the drawer is provided with a slope configured to accommodate at least a part of the cover when the drawer is in a pulled out state,*

*wherein the slope is formed on at least one sidewall of the drawer and includes a slope downwardly-inclined and a slope upwardly-inclined, the slope downwardly-inclined being provided on a portion of the sidewall behind a midpoint of the sidewall in a front-to-rear direction of the sidewall and configured to enable the cover to be rotated downwards such that the cover does not interfere with pulling out of the another drawer above the drawer.*

*13. The refrigerator according to claim 12, further comprising a shelf located above the drawer in the storage compartment, and*

*wherein the shelf is provided to cover a rear portion of the cover at the top of the drawer when the drawer is in a pushed in state.*

*14. The refrigerator according to claim 12, wherein the at least one sidewall further includes a horizontal plane provided between the slope upwardly-inclined and the slope downwardly-inclined slope.*

*15. The refrigerator according to claim 12, wherein the cover includes a downwardly-protruding portion in contact with the drawer.*

*16. The refrigerator according to claim 15, wherein the downwardly-protruding portion includes a roller to cause rolling friction between the cover and the drawer.*

*17. The refrigerator according to claim 12, wherein the drawer is configured to be pulled out from the body in a sliding manner, and the drawer is provided with a telescopic slide rail.*

*18. The refrigerator according to claim 12, wherein the drawer has a longer pull-out distance than a pull-out distance of the another drawer.*

* * * * *